Oct. 25, 1966

W. C. BARKLEY 3,280,995

APPARATUS FOR INVERTING ARTICLES

Filed Oct. 30, 1964

WILLIAM C. BARKLEY
INVENTOR

Huebner & Worrel
ATTORNEYS

Oct. 25, 1966   W. C. BARKLEY   3,280,995
APPARATUS FOR INVERTING ARTICLES
Filed Oct. 30, 1964
2 Sheets-Sheet 2
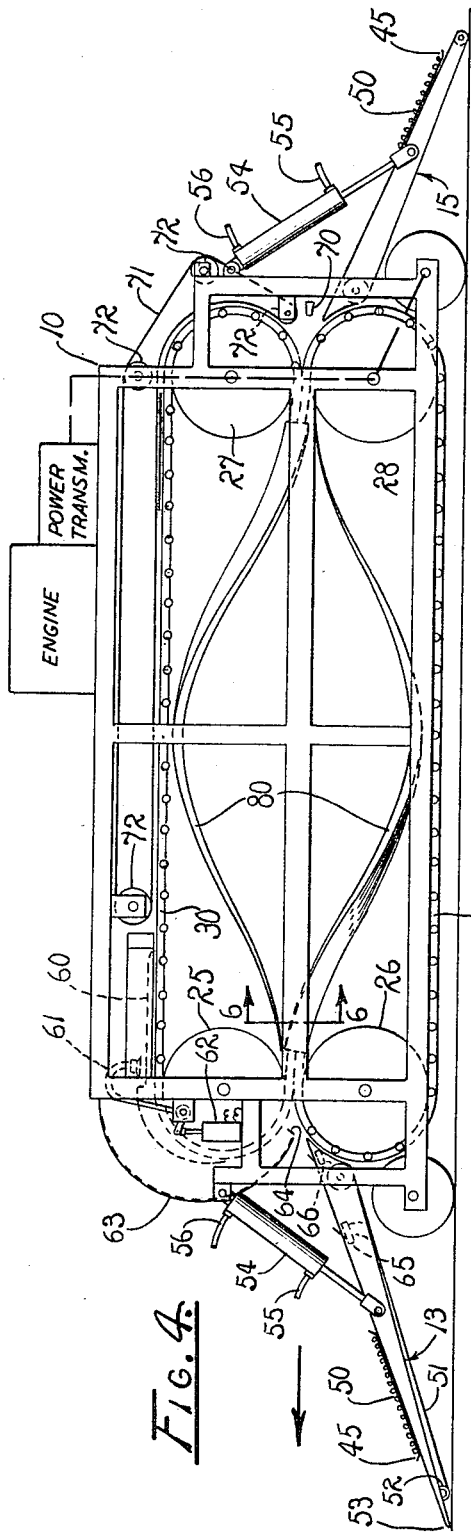
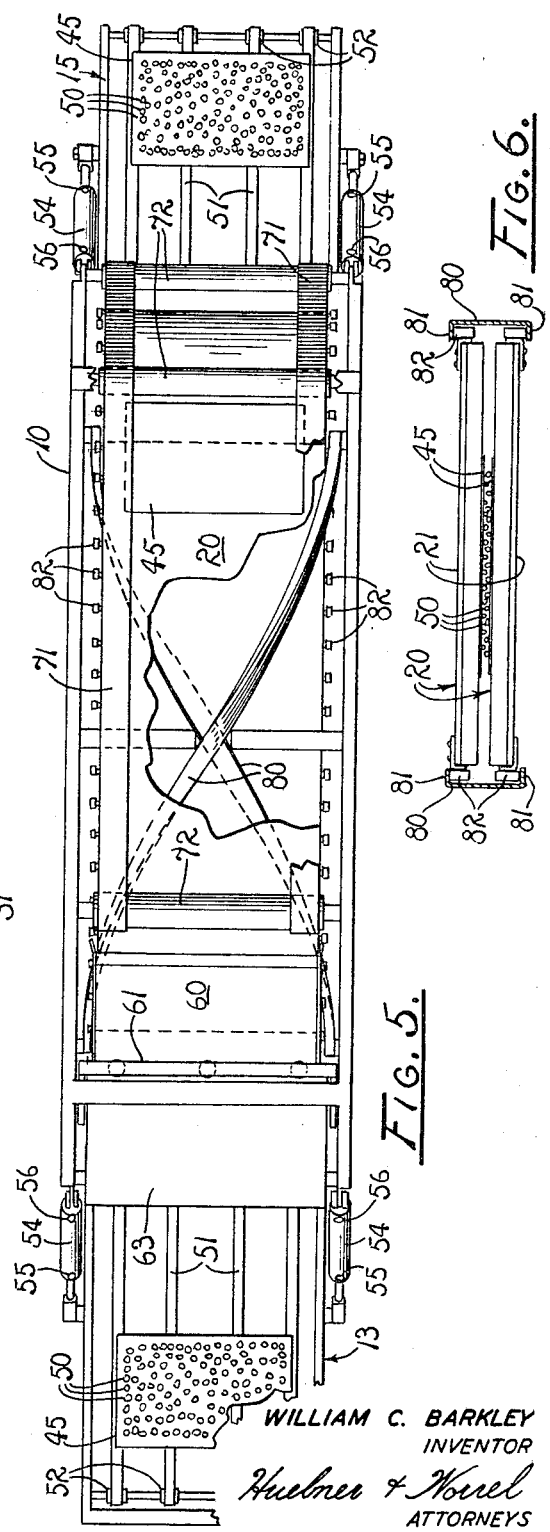
WILLIAM C. BARKLEY
INVENTOR
Huebner & Worrel
ATTORNEYS United States Patent Office 3,280,995
Patented Oct. 25, 1966

3,280,995
APPARATUS FOR INVERTING ARTICLES
William C. Barkley, 2123 Gaither St., Selma, Calif.
Filed Oct. 30, 1964, Ser. No. 407,668
4 Claims. (Cl. 214—301)

This invention relates to apparatus for inverting articles from a first position of orientation, and particularly relates to such apparatus adapted to receive, transport, and discharge articles, while concurrently effecting a 180° physical inversion of their respective attitudes.

In many environments, a plurality of articles must necessarily be inverted to permit various successive processing functions to be performed. For example, certain food articles are turned to an inverted position during processing or packaging, while many fabricated items of manufacture of a generally planar configuration are inverted to permit successive operations on their respective opposite sides.

A specific example of physically inverting a food item is the turning, or inverting, of grapes during the drying period to produce raisins. The climate of the San Joaquin Valley of California is particularly well-suited for natural drying of grapes in raisin production. A low humidity, unobscured solar radiation and normal absence of rain during the latter part of August and throughout the month of September provide optimum climatic conditions for producing raisins from grapes.

Prior to the present invention, the normal procedure in drying grapes for raisins includes placing individual drying trays between adjacent rows of grapevines growing in the vineyard. Bunches of mature grapes are cut from the vines and placed on the trays so as to afford maximum exposure to the sun and the air. Usually, the grapes are arranged in a single layer of bunches to avoid non-uniform drying. The trays are in the form of substantially flat kraft paper of a sufficient weight to withstand the strain imposed by the weight of the grapes. With the grapes resting on the tray, the tray is somewhat in the configuration of a shallow pan providing an upwardly disposed cavity and marginal slightly upturned edges.

At approximately the midpoint in the drying process, the grapes are physically inverted from their original position of orientation to permit their respective opposite sides to be dried. The normal procedure is to place a second tray in overlying relation to the grapes, and, while maintaining at least two of the laterally opposed marginal edges in mutual contact, concurrently inverting the two trays and the grapes captured therebetween. Subsequent to the inverting of the trays and the grapes, the then uppermost tray is removed, and the preceding covering tray then is employed as a supporting tray for other grapes.

The grapes are permitted to remain in the vineyard until completion of their drying to produce raisins, whereupon they are subsequently gathered. Obviously, the individual manual turning of such trays of raisins represents labor cost as a high percentage of the total cost of production of raisins, notwithstanding the availability of radiation and drying air of low humidity in the San Joaquin Valley. In addition, during the drying period, the grapes must be turned at approximately the midpoint of the drying period for optimum raisin production. Frequently, sufficient workmen are not available at this midpoint so as to achieve raisin production in the shortest time period and at a minimum cost. Accordingly, a need has existed for apparatus capable of physically inverting articles, such as trays of grapes being dried for raisin production.

While the present invention is described in detail in connection with the turning of trays of grapes intended for raisin production, this is but one example of its utility. Other fields of use of the invention will readily occur to those skilled in the art.

Accordingly, it is an object of the present invention to provide apparatus for physically inverting articles from a given position of orientation to a second position inverted from the first.

Another object is to provide apparatus specifically adapted for turning trays of grapes being dried in the field for raisin production and depositing such trays in substantially the same location occupied prior to the turning process.

Another object is to provide apparatus for inverting articles which insures a 180° physical inversion of the article without subjecting the article to undue acceleration forces.

Another object is to provide such an apparatus capable of inverting an object loosely confining a plurality of articles therein which insures maintenance of the relative positions of the articles while effecting a physical inversion thereof.

A further object is to provide a completely integrated apparatus capable of progressive movement through a vineyard while inverting trays of grapes successively encountered and depositing the inverted trays in substantially their previous locations while concurrently recovering grape supporting trays for subsequent use.

These, together with other objects, will become more fully apparent upon reference to the following description and accompanying drawings.

In the drawings:

FIG. 4 is a view in side elevation of an integrated apparatus capable of inverting trays supporting grapes thereon.

FIG. 5 is a top plan view of the apparatus of FIG. 4, with portions broken away for illustrative convenience.

FIG. 6 is an enlarged view in vertical, transverse section taken on line 6—6 of FIG. 4.

Figure 1:
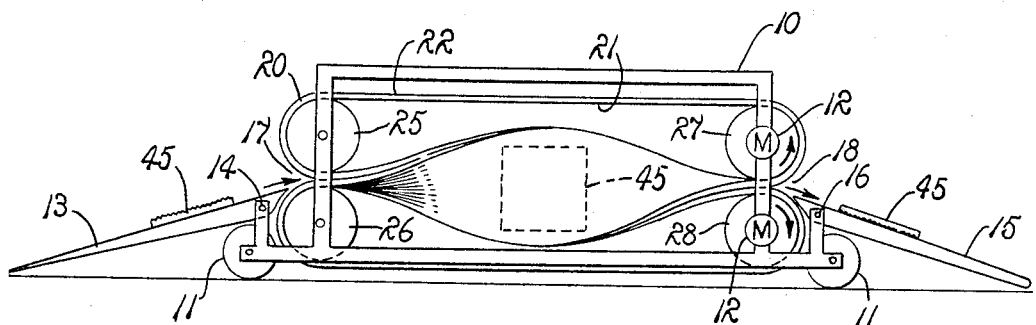
FIG. 1 is a view in side elevation, somewhat schematic, of a simplified first form of the invention.
Figure 2:
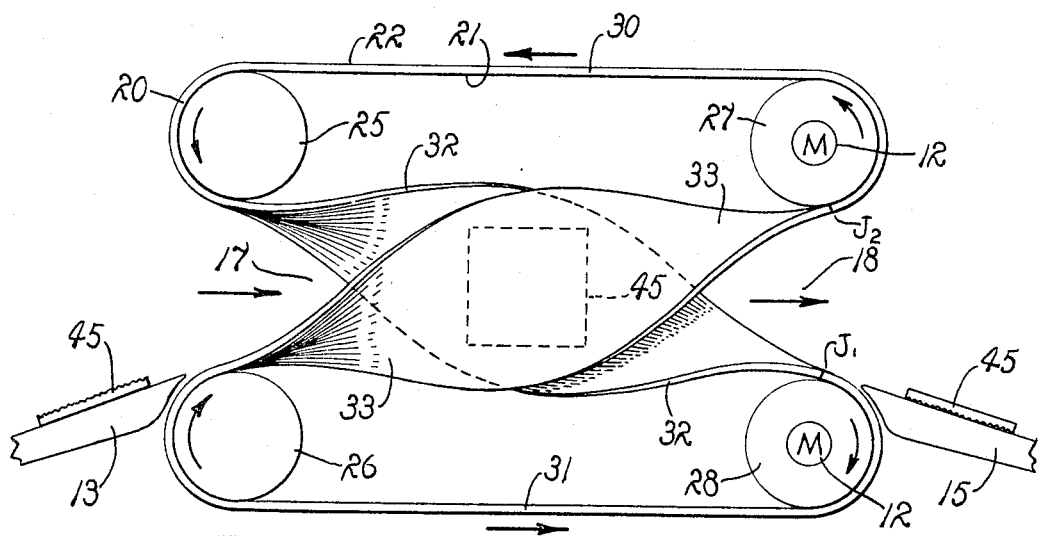
FIG. 2 is a fragmentary enlarged view of portions of the apparatus of FIG. 1, the conveyor belt thereof being shown in an expanded condition for purposes of clarity.

Referring in greater particularity to FIGS. 1 and 2 of the drawings, a first form of the invention is illustrated as including a supporting frame 10 adapted for mobility by longitudinally spaced pairs of ground engaging wheels 11. A plurality of motors 12 are supported in the frame and adapted for driving connection to at least one pair of the wheels by suitable power transmission mechanism, not shown. In certain environments, the frame can be mounted in a stationary manner; in others, the apparatus will be desired as a self-propelled vehicle. A forward ramp 13 is pivotally connected at 14 to the frame 10 and provides a propelling upwardly inclined surface of support. In a similar manner, a rear ramp 15 is pivotally connected at 16 to the frame and provides a propelling upwardly disposed surface of support downwardly inclined from the frame. The structural details of the ramps 13 and 15 are not described in the first form of the invention, since greater emphasis will be placed upon these elements in the second form. The ramps 13 and 15 respectively lead to and away from an admission station 17 at the forward end of the vehicle and a discharge station 18 at the rearward end. As viewed in FIG. 1, the vehicle is adapted for movement from right to left.

An endless conveyor belt 20 provides opposite first and second surfaces 21 and 22. Longitudinally spaced sets of rollers 25, 26, 27, 28 are mounted in the frame 10 for rotation about respective parallel axes and arranged in relative upper and lower relation. As shown in FIGS. 1 and 2, rollers 25 and 26 constitute a forward set of rollers, while rollers 27 and 28 constitute a rearward set longitudinally spaced from the forward set. The motors 12 are mounted internally of the rollers 27 and 28 to power the rollers for rotation in opposite directions and to effect consequent propelling of the conveyor belt 20. As viewed in FIG. 1, roller 27 rotates in a counterclockwise direction, while roller 28 rotates in a clockwise direction.

As can be seen more clearly in FIG. 2, the continuous conveyor belt is arranged in a figure eight pattern about the rollers 25, 26, 27 and 28. The belt thereby provides substantially straight upper and lower runs 30 and 31, and a pair of contiguous transversely twisted intermediate runs 32, 33. The term "substantially straight" refers to the absence of transverse twist about the circumferential centerline of the belt, rather than the rectilinear aspect of the run longitudinally of the frame 10.

It will be observed that the intermediate runs are each transversely twisted 180° throughout their respective longitudinal extent so that each of the intermediate runs commences at the forward end of the frame with its respective first side 21 in contact with a respective one of the rollers 25, 26, while the first side at the opposite end of the vehicle is disposed in contact with the opposite vertically spaced roller of the other set. For example, the intermediate run 32 commences at the forward end of the vehicle with the first surface 21 in contact with the roller 25. The intermediate run 32 extends rearwardly in the frame and is transversely twisted 180° about the circumferential centerline of the belt during the extent of the intermediate run, so that the first side 21 is disposed in contact with the lower roller 28 of the rearward set of rollers. As can be seen in FIGS. 1 and 2, the second side 22 of the conveyor belt is the apparent outer, or exposed, side of each of the intermediate runs 32 and 33. As illustrated in FIG. 1, the second sides of the intermediate runs are in mutual intimate contact. This contact between the intermediate runs extends from the admission station 17 to the discharge station 18.

Figure 3:
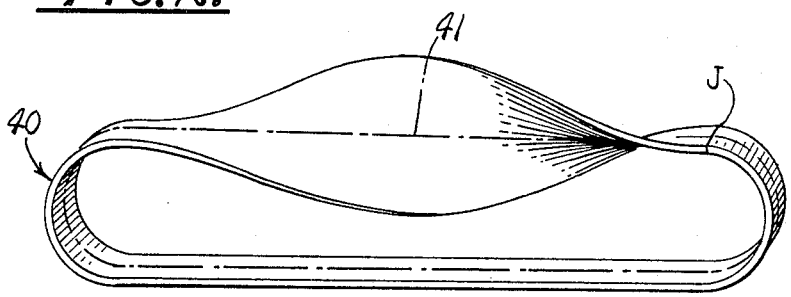
FIG. 3 is a view in side elevation of a conveyor belt in the form of a moebius strip.

A comparison of the mathematical principle involved in the conveyor belt 20 may be made with that of a twisted loop 40, shown in FIG. 3 and commonly referred to as a moebius strip. As illustrated in FIG. 3, the moebius strip is a continuous loop having a 180° transverse twist placed therein. The method of construction usually includes the transverse cutting of a continuous, untwisted loop and subsequently twisting one portion 180° prior to rejoining the cut ends of the loop, as by a joint indicated at "J." Mathematically speaking, such a moebius strip has but one side and but one edge.

Considering the continuous belt 20 of FIG. 2, as being separated at the joints indicated at $J_1$ and $J_2$ and subsequently joined at those points, but reversing the relative upper and lower positions of the rearward ends of the intermediate runs 32 and 33, a pair of moebius strips would be formed. Accordingly, the conveyor belt 20 when arranged in the figure eight pattern shown in FIG. 2, is in effect a pair of moebius strips running on contact with each other, but arranged in a continuous loop.

In arranging the belt 20 about the rollers, the conveyor belt normally is first separated, as for example at one of the joints $J_1$ or $J_2$ and then threaded about the rollers in the figure eight pattern. Subsequently, the belt is rejoined to provide a continuous conveyor belt. Mathematically, the same result is achieved by dividing the moebius strip along its circumferential centerline 41 so as to form a continuous loop having 720° of twist. By arranging such a continuous loop in the figure eight pattern of FIG. 2, one complete twist, or 360°, is apparently lost. Consequently, each of the intermediate runs 32, 33 is twisted 180° which accounts for the remaining 360° of twist in the belt. Of course, an object riding between the belts is inverted only 180° while being conveyed through the frame from the admission station 17 to the discharge station 18.

For example, a substantially planar article 45 traversing the forward ramp 13 is admitted between the intermediate runs 32, 33 of the conveyor belt at the station 17. Continued movement of the belt under the influence of the motors 12 conveys the article 45 rearwardly while concurrently inverting the article 180° from its original position of orientation. Throughout the path of travel through the frame, the article 45 is dependably held between the respective second surfaces of the intermediate runs 32 and 33 and inverted at a rate dependent upon the velocity of movement through the frame. This velocity is selected so that acceleration forces experienced during the inverting is held at an acceptable value.

*Second form*

A second form of the invention includes all of the major elements illustrated in connection with the first form, and similar reference numerals are respectively assigned to such elements. In addition to such elements, other structural components will be described in greater detail for an understanding of this second form.

A grape tray formed of kraft paper is a specific form of the article 45 formed to be inverted and normally holds a plurality of bunches of grapes 50. In such a configuration, the tray 45 provides a support surface which can be considered as forming a rather shallow cavity loosely confining the grapes therein. Stated differently, the grape trays in the first position of orientation shown on the forward ramp 13 provides an upwardly disposed surface on which the grapes 50 are deposited. Since the tray 45 is to be subsequently inverted to a covering position over a second tray, the first tray will be removed and later used as a supporting tray. Also, since the tray has been resting on the ground, it will be appreciated that side in contact with the ground will subsequently be employed as the ground engaging side, rather than the side containing the raisins.

As a propelling surface on each of the ramps 13 and 15, a plurality of continuous belts 51 are supported for circuitous movement about spaced pulleys 52 rotatably mounted in each of the ramps. The belts 51 are transversely spaced in each of the ramps so as to provide sufficient support for the trays traversing the ramps. In the case of grape trays 45, which are quite flexible, the transverse spacing of the belts is in close proximity to afford narrow intervals of spacing. For purposes of clarity in the drawings, the intervals of spacing are shown in greater size than that employed in a commercial embodiment of the second form.

To facilitate initial movement of the trays 45 upon the forward ramp 13, a prow 53 is provided and arranged for selective elevational movement relative to the surface of the ground by means of an hydraulic ram 54 pivotally interconnected between the ramp and the frame. The rearward ramp 15 is likewise provided with a ram 54, and both rams are connected to a suitable source of pressure fluid, not shown, by flexible hoses fragmentarily illustrated at 55 and 56.

The frame supports a supply hopper 60 for the trays 45 which alternatively serve as covers during the inverting process. A pneumatic dispensing device 61 is carried by the frame and actuated under the influence of an operating motor 62 for individual dispensing of the trays in an inverted position. An arcuate delivery chute 63 defines a path of travel for trays dispensed from the hopper 60 so as to position them above the admission station 16, but restrained by a release gate 64, also under the influence of a suitable operator, not shown. A sequencing sensing switch 65 is mounted on the ramp 13 for contact by a tray 45 and connected in control relation to the dispensing operator 62. In a similar manner, a second sequencing switch 66 is mounted in the frame and arranged in control relation to the operator of the release gate 64. Consequently, coordinated release of a tray from the hopper 60 is provided so that it is dispensed in an inverted position in overlying relation to a tray traversing the forward ramp prior to passing through the admission station.

A pneumatic tray lifting nozzle 70 is mounted in the frame at a point adjacent to the discharge station 18 and connected to a suitable source of air under pressure, not shown, so as to raise that tray which is then in a superior position at the discharge station. A pair of transversely spaced recovery belts 71 are trained about suitable pulleys 72 rotatably mounted in the frame. Each of the belts 71 is in intimate driving contact with the second surface 22 of the upper run 30 of the belt 20 to accept the then superior, or covering tray, and transport the recovered tray to the hopper 60.

A pair of belt guides 80 in the form of U-shaped channels affording opposite flanges 81 are mounted in the frame 10 in a configuration to follow a portion of the figure eight pattern of the belt 20. The marginal edges of the belt 20 are each provided with a plurality of circumferentially spaced rollers 82 received in a respective one of the guides 80 between the flanges 81. In the form of the invention shown in FIGS. 4, 5 and 6, the belt 20 is provided with a resilient covering, such as foamed polyurethane to afford the second surface 22. Consequently, a pair of trays 45, as illustrated in FIG. 6, are dependably urged toward each other to maintain the grapes 50 therebetween throughout the extent of the intermediate runs from the admission station 17 to the discharge station 18.

*Operation*

The operation of the first form of the invention is essentially the same as that of the second form with the exception of the sequencing switches, tray recovery and subsequent dispensing. Consequently, a description of the operation of the second form will suffice for both.

The mobile frame 10 is propelled between spaced, longitudinally extended rows of grapevines growing in a vineyard. The trays 45 have previously been covered with grapes, which may be considered as filling the trays. The trays are arranged between the adjacent rows of vines in substantial alignment extending longitudinally of the rows. Consequently, propelling the vehicle between such rows will cause successive engagement of the trays 45 by the prow 53 of the forward ramp 13. Appropriate controlling movement of the forward hydraulic ram 54 insures successful engagement of the individual trays by the prow 53.

Continued forward movement of the frame 10 effects driving engagement between the underside of a tray 45 by the belts 51 of the forward ramp. The belts are driven by the motors 12 through suitable power transmission equipment, not shown, to effect a movement relative to the frame 10 at a race substantially equal to the rate of movement of the frame 10 relative to the ground. Consequently, there is no appreciable relative movement between the trays 45 and the surface of the ground. The reason for such correlated rates of movement is to insure that a tray lifted from the ground will subsequently be inverted to transfer the grapes 50 to a second tray from hopper 60 for later depositing in substantially the original position of the first tray.

Continued movement of the forward ramp 13 causes contact of the first sensing switch 65 by the tray 45. The operator 62 under the control of switch 65 moves the dispensing device 61 to lift a tray from the supply hopper 60 for positioning in the delivery chute 63. Further traversal of the ramp 13 causes engagement of the second sensing switch 66 to actuate the release gate 64 and permit release of the inverted tray in overlying relation to the tray traversing the forward ramp. Consequently, the grapes 50 pass through the admission station 17 in a sandwich relation between a supporting tray and a covering tray.

The rollers 25 and 26 are vertically spaced at a sufficient distance to admit therebetween two thicknesses of belt 20 simultaneously with the article to be inverted, which in the second form of the invention is a tray filled with grapes. Due to the resiliency of the foamed polyurethane, and the relative spacing of the flanges 81 of the belt guides 80, the second surface 20 of each of the intermediate runs 32, 33 is urged into intimate contact with the other. Accordingly, the two trays and the grapes sandwiched therebetween are propelled through the frame as a unit, while concurrently being inverted prior to passing between the rear set of rollers 27, 28 at the discharge station 18.

At the time of discharge, a jet of air issuing from the nozzle 70 raises the covering tray for reception between the tray recovery belts 71 and the conveyor belt 20. Further movement of the conveyor belt 20 transports the recovered tray forwardly in the frame for subsequent ejection of the tray into the supply hopper 60. It will be observed that the tray so deposited in the hopper 60 previously served as the supporting tray for the grapes traversing the forward ramp 40, while the dispensed tray through delivery chute 63 and release gate 64 is now the supporting tray for such grapes. The tray then supporting the grapes at the discharge station 18 traverses the rearward ramp 15 at a correlated rate of movement corresponding to that of the forward ramp so as to be deposited in substantially the same location occupied by the grapes 50 prior to their inversion.

Accordingly, the present invention provides apparatus for the physical inverting of articles, such as substantially planar trays of grapes and the like. In the case of the turning of grapes for raisin production, the invention provides a completely integrated apparatus which insures dependable turning of the grapes and efficient utilization of the trays previously employed for drying purposes. The apparatus provides sequencing switches in control relation to dispensing mechanism to insure appropriate utilization of the trays and deposition of the inverted grapes in substantially the same location as previously occupied.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. Apparatus adapted to invert an article from a first attitude resting on a tray comprising supporting frame means; conveyor means mounted in the frame means and defining a path of travel extending from an admission station to a discharge station and including means for receiving the article in said first attitude, and propelling the article along said path of travel while concurrently inverting the article prior to reaching the discharge station; means providing a supply of protective covers; dispensing means disposed adjacent to the admission station of the conveyor means to deposit one of the protective covers over said article in overlying relation to the tray prior to traversing the path of travel; power means connected to said conveyor means in driving relation to propel the article along said path of travel while concurrently inverting the article, the tray and the cover as a unit so that the article is resting upon the cover in an inverted position upon reaching the discharge station; tray recovery means disposed adjacent to said discharge station to remove the tray then in a superposed position relative to the article; tray transport means mounted on the frame to carry the recovered tray to said supply of covers for subsequent dispensing as a cover; and timing means supported on the frame in a position adjacent to the admission station for actuation by an article passing therethrough and arranged in control relation to said dispensing means for individual timed release of a cover over the article.

2. A mobile vehicle adapted for ground traversing movement in a predetermined forward direction and inverting of an object resting on the ground comprising a frame having longitudinally spaced forward and rearward ends;

a continuous conveying belt having opposite first and second surfaces; a pair of longitudinally spaced sets of rollers mounted in the frame for rotation about respective parallel axes, the rollers of each set being vertically spaced to provide upper and lower rollers and to admit therebetween two thicknesses of the belt simultaneously with the object to be inverted, the belt being arranged in the frame and trained about the rollers in a circuitous figure eight pattern to provide upper and lower runs and a pair of contiguous intermediate runs, the upper and lower runs being arranged in respective substantially straight runs, each of the intermediate runs commencing at the forward end of the frame with said first side of the belt disposed in contact with a respective one of the upper and lower vertically spaced rollers of one set and being transversely twisted 180° about the circumferential centerline of the belt during the intermediate run so that said first side is disposed in contact with the opposite vertically spaced roller of the other set at the rearward end of the frame, the second side surface of each of said intermediate runs being in intimate contact with the other intermediate run substantially throughout the distance between said spaced set of rollers to define a path of travel therebetween extending from a forward admission station to a discharge station; power means connected to the belt in driving relation to move the belt about the rollers in the circuitous figure eight pattern and propel the object along the path of travel when inserted between said contiguous intermediate runs at the admission station and concurrently inverting the object prior to reaching the discharge station; means carried at the forward end of the vehicle and adapted to engage the object resting on the ground surface in a predetermined position of vertical orientation and to elevate said object to the admission station while maintaining said position; and means carried at the rearward end of the frame to receive the inverted object and to deposit the same on the ground surface while maintaining said inverted position.

3. A mobile vehicle adapted for ground traversing movement along a line of intended travel at a predetermined velocity and having opposite forward and rearward ends relative to the direction of travel comprising a frame defining a longitudinal axis parallel with said line of intended travel; a continuous conveying belt having a first frictional driving surface and an opposite second resiliently cushioned surface; a pair of longitudinally spaced sets of rollers mounted in the frame for rotation about respective parallel axes, the rollers of each set being vertically spaced to provide upper and lower rollers and to admit therebetween two thicknesses of the belt simultaneously with an object to be inverted, the belt being arranged in the frame and trained about the rollers in a circuitous figure eight pattern to provide upper and lower runs and a pair of contiguous intermediate runs, the upper and lower runs being arranged in respective substantially straight runs, each of the intermediate runs commencing at the forward end of the vehicle with said first side of the belt disposed in contact with a respective one of the upper and lower vertically spaced rollers of one set and being transversely twisted 180° about the circumferential centerline of the belt during the intermediate run so that said first side is disposed in contact with the opposite vertically spaced roller of the other set at the rearward end of the vehicle, the cushioned second side surface of each of said intermediate runs being in intimate compressive contact distance between said spaced set of rollers to define a path of travel therebeween extending from an admission station to a discharge station; power means connected to at least one of said rollers to move the belt about the rollers in the circuitous figure eight pattern and propel the object along the path of travel when inserted between said contiguous intermediate runs at the admission station and concurrently inverting the object prior to reaching the discharge station; guide means mounted in the frame to urge said intermediate runs of the belt into mutual compressive contact; an elevating ramp carried at the forward end of the vehicle and adapted to engage a receptacle tray resting on the surface of the ground in a predetermined position of vertical orientation and affording a normally upwardly disposed supporting surface, the tray loosely confining a plurality of discrete articles thereon, said ramp means adapted to elevate said tray to said admission station as an object to be inverted while maintaining said predetermined position of orientation; a supply of trays carried on the vehicle; dispensing means carried on the frame for individual dispensing of the trays in an inverted position as a cover tray with their respective supporting surfaces downwardly disposed in overlying relation to a tray traversing the forward ramp prior to passing through said admission station; ramp means mounted at the rearward end of the vehicle to receive the inverted receptacle tray and the cover tray as a unit with the articles resting on the cover tray; means to recover the inverted receptacle tray and to return the recovered tray to the supply carried on the vehicle; and means to deposit the inverted cover tray with the articles inverted thereon to the surface of the ground while maintaining said inverted position, wherein the rate of movement of the receptacle tray through the vehicle and the rate of movement of the inverted cover tray deposited on the ground are substantially equal to the velocity of the vehicle so that the articles are deposited in substantially the same location occupied prior to inversion.

4. The mobile vehicle of claim 3 wherein timing means are mounted on the ramp for successive engagement by receptacle trays traversing the ramp and arranged in control relation to the dispensing means to insure subsequent timed dispensing of the recovered trays as covers.

References Cited by the Examiner

UNITED STATES PATENTS

| 1,519,154 | 12/1924 | Mitton | 53—392 |
|---|---|---|---|
| 2,111,163 | 3/1938 | Yecny | 214—301 |
| 2,763,110 | 9/1956 | Stuart | 53—392 X |
| 2,947,406 | 8/1960 | Hazelton | 198—33 |

FOREIGN PATENTS

| 1,091,091 | 10/1960 | Germany. |
|---|---|---|
| 818,684 | 8/1959 | Great Britain. |

MARVIN A. CHAMPION, *Primary Examiner.*